US00RE40754E

(19) United States
(12) Reissued Patent
Morton

(10) Patent Number: US RE40,754 E
(45) Date of Reissued Patent: Jun. 23, 2009

(54) PORTABLE INFANT BED

(76) Inventor: Farah D. Morton, P.O. Box 716, Woodbridge, CA (US) 95258

(21) Appl. No.: 10/716,247

(22) Filed: Nov. 17, 2003

Related U.S. Patent Documents

Reissue of:
(64) Patent No.: 6,370,715
Issued: Apr. 16, 2002
Appl. No.: 09/406,510
Filed: Sep. 28, 1999

(51) Int. Cl.
*A47C 20/02* (2006.01)

(52) U.S. Cl. ..... 5/655; 5/94; 5/95; 5/99.1
(58) Field of Classification Search ..... 5/655, 5/425, 95, 947, 732, 630, 632, 94, 99.1; D6/601
See application file for complete search history.

(56) References Cited

U.S. PATENT DOCUMENTS

| | | | | |
|---|---|---|---|---|
| 279,134 | A | | 6/1883 | Comins |
| 385,633 | A | | 7/1888 | Kelly et al. |
| 469,253 | A | | 2/1892 | Johnston |
| 2,281,629 | A | | 5/1942 | Snow |
| 2,401,605 | A | | 6/1946 | Boren |
| 2,475,775 | A | | 7/1949 | Boren |
| 2,570,361 | A | | 10/1951 | Mejia |
| 2,602,171 | A | | 7/1952 | Good |
| 2,797,743 | A | | 7/1957 | Rodtz, Jr. |
| 3,003,164 | A | | 10/1961 | Calvelage |
| 3,018,492 | A | | 1/1962 | Rosen |
| 3,096,917 | A | | 7/1963 | Gudiksen |
| 3,269,621 | A | | 8/1966 | Dishart |
| 3,323,147 | A | * | 6/1967 | Dean ..... 5/98.1 |
| 3,336,608 | A | | 8/1967 | Lerner |
| 3,383,718 | A | | 5/1968 | Spencer |
| 3,466,678 | A | | 9/1969 | Glaser |
| 3,513,489 | A | | 5/1970 | Miller et al. |
| 3,578,380 | A | | 5/1971 | Jacobus |
| 3,708,808 | A | | 1/1973 | Irby |
| 3,729,752 | A | | 5/1973 | Huggins |
| 3,763,506 | A | | 10/1973 | Szego |
| 3,931,652 | A | | 1/1976 | Navarra |
| 4,003,098 | A | | 1/1977 | Fink |
| 4,204,695 | A | | 5/1980 | Salzman |
| D259,458 | S | | 6/1981 | Fuller et al. |
| 4,366,587 | A | | 1/1983 | Takada |
| 4,416,462 | A | | 11/1983 | Thompson |
| 4,441,221 | A | | 4/1984 | Enste et al. |
| 4,471,767 | A | | 9/1984 | Guimond |
| 4,499,619 | A | | 2/1985 | Kassai |
| 4,583,253 | A | | 4/1986 | Hall |
| 4,635,305 | A | | 1/1987 | Wyss |
| 4,670,923 | A | | 6/1987 | Gabriel et al. |

(Continued)

*Primary Examiner*—James M Hewitt
(74) *Attorney, Agent, or Firm*—Harris Zimmerman

(57) ABSTRACT

A portable bed for a newborn infant made up of a rectangular flat support surface which holds a firm infant mattress pad, the surface having a rigid headboard perpendicularly attached at one end, and rigid perpendicular partial side walls attached to both the support surface and to the headboard. A hinge is provided about midway along the longitudinal length of the support surface allowing the unit to be closed against itself to facilitate easy transport. A soft fabric cover is provided to cover the surface, headboard and side walls. A firm waterproof mattress pad having the same dimensions as the support surface is also provided. A pair of handles may also be provided at either end of the support surface for carrying the unit when folded together.

42 Claims, 7 Drawing Sheets

U.S. PATENT DOCUMENTS 4,698,862 A 10/1987 Mairs
4,712,258 A 12/1987 Eves
4,741,056 A * 5/1988 Kassai ..... 5/99.1
4,750,223 A 6/1988 D'Arcy et al.
4,761,032 A 8/1988 Sanchez et al.
4,819,284 A 4/1989 Brown
4,819,285 A 4/1989 Fetters
4,873,734 A 10/1989 Pollard
4,999,863 A 3/1991 Kane
5,103,514 A 4/1992 Leach
5,115,524 A 5/1992 Antosko
5,172,435 A 12/1992 Griffin et al.
5,216,772 A 6/1993 Clute
5,233,710 A 8/1993 Bernard
D342,405 S 12/1993 Hazel
5,333,769 A 8/1994 Skroski
5,359,739 A 11/1994 Rains et al.
5,367,730 A 11/1994 Sher
5,377,368 A 1/1995 Cheng
5,379,469 A 1/1995 Millis et al.
5,383,711 A 1/1995 Houghteling
5,409,411 A 4/1995 Schrieber
D359,869 S 7/1995 Oren
5,430,899 A 7/1995 Chisholm
D366,368 S 1/1996 McCarthy
5,528,785 A 6/1996 Petrus
5,551,108 A 9/1996 Butler, III
5,562,330 A 10/1996 Jane Cabagnero
5,604,941 A 2/1997 Roman
5,675,853 A 10/1997 Linge
5,708,994 A 1/1998 Chandran
5,713,090 A 2/1998 Rodgers
D391,780 S 3/1998 Onishi
5,730,490 A 3/1998 Mortenson
D397,882 S 9/1998 Wu
5,800,368 A 9/1998 Klingemann et al.
5,802,635 A 9/1998 Chen
5,806,924 A 9/1998 Gonas
5,813,558 A 9/1998 Burke
5,819,341 A 10/1998 Simantob et al.
5,826,287 A 10/1998 Tandrup
5,884,348 A 3/1999 Onishi et al.
5,913,089 A 6/1999 Ebe
5,916,089 A 6/1999 Ive
5,937,461 A 8/1999 Dombrowski et al.
5,987,665 A 11/1999 Simantob et al.
6,023,802 A 2/2000 King
6,112,347 A 9/2000 Tharalson et al.
6,205,600 B1 3/2001 Sedlack
6,370,715 B1 4/2002 Morton
6,549,140 B1 4/2003 Koessler
6,651,275 B1 11/2003 Rummell
6,654,275 B2 11/2003 Forbes
6,704,949 B2 3/2004 Waldman et al.
6,823,547 B1 11/2004 Harding et al.
6,907,627 B2 6/2005 Waldman et al.
6,954,955 B2 10/2005 Brewin et al.

* cited by examiner

PORTABLE INFANT BED

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to sleeping structures for human infants, and more specifically to a new portable infant bed having an integral headboard and partial sidewalls that may be placed on any flat surface, particularly on an adult bed next to the parent(s) of the infant.

2. Description of the Prior Art

It is well known that newborn human infants require a great deal of sleep. The most common sleeping place for newborns and small infants during the first few months of life is in a bassinet. Then, as the infant grows, it eventually becomes too large for the bassinet and is typically moved to a crib.

Most newborn infants are unable to raise their heads for a number of days or weeks after birth, and most are unable to roll themselves over for several weeks or months. Because of the limited mobility of most newborns, the bassinet where they sleep is typically provided with a firm and flat mattress pad and no pillow in order to help prevent inadvertent suffocation of the infant. A tall peripheral wall around the bassinet prevents the infant from falling out. Unfortunately, these features make the bassinet bulky and difficult to transport.

It is typical for the adult parents of newborn infants to keep the bassinet in the adult bedroom at night. This facilitates easy access to the infant during the night for feeding, changing or other needs that the infant may have. However, the unpredictable and sometimes irrational demands of newborn infants can take their toll on the new parents and deprive them of much needed night sleep. Often, the warm and soothing touch of the parents is all that is necessary to help the infant fall asleep. Unfortunately, it can be both awkward and uncomfortable to lean over or reach into the bassinet in order to comfort the infant, especially when the tired parent would much rather be lying down. It is therefore desirable to provide an infant bed that can be easily accessed by the parent while lying down.

The only known apparatus for allowing an infant to sleep on the same bed as the parent is disclosed in U.S. Pat. No. 5,713,090. The apparatus of this patent is a dome shaped frame which extends over the baby to prevent the baby from being smothered by the parent inadvertently rolling on top of the baby while the parent is sleeping. This frame is easily moved around in the bed, especially when farther away the parent. In addition, it makes it difficult to access the baby. Finally, it may be unsafe in that it is possible for the baby's head to become entangled in the frame.

SUMMARY OF THE INVENTION

The present invention makes it possible to allow an infant to sleep in the same bed as the parent by providing a rectangular flat support surface for holding a firm infant mattress pad, the surface having a rigid headboard perpendicularly attached at one end thereof and rigid perpendicular partial side walls attached to both the support surface and to the headboard. A manufactured or fabric hinge is provided midway down the longitudinal length of the support surface allowing said surface to be closed against itself to facilitate easy transport. The support surface, headboard and side walls may all be integrated into a single unit. Alternatively, the headboard and side walls may be removably attached to the support surface so that the unit takes up less space during storage or transport. A soft fabric cover is provided to cover the surface, headboard and side walls. A firm waterproof mattress pad having the same dimensions as the support surface is also provided. An envelope sheet for the mattress may be provided which completely encloses the mattress like a pillow sham. A pair of handles may also be provided at either end of the support surface for carrying the unit when folded together. The fabric cover may be quilted and flame retardant.

The rigid headboard and side walls prevent the infant from exiting the bed, prevent the adults from rolling over onto the infant while they are sleeping, and protect the infant from the suffocation dangers posed by adult pillows. The placement of the unit also lifts the infant above the level of the adult bodies and potentially hazardous sheets, blankets and bedding. The partial side walls allow the adults to reach into the bed from the foot region allowing access to the infant without going over the walls. The envelope sheet for the mattress helps prevent suffocation.

The present invention allows an infant to sleep with the adults in the adult bed. It also provides a place for the infant to nap on an adult bed during the day. In day use situations, the unit may be placed between pillows on the adult bed, with the open end of the unit placed against the headboard of the adult bed to arrest backward movement of the infant. The present invention is portable, and is especially useful while traveling (in hotels, airports, while visiting friends or relatives, day care, at the park, etc.) to provide a familiar place for the infant to sleep. The unit can be moved from room to room so that the parents can keep the baby near them in the house during the day.

The present invention is particularly useful to new mothers who have undergone Caesarian section operations during delivery. During the several weeks of recovery after delivery, the present invention allows the newborn to be near the new mother thereby helping her to avoid some uncomfortable and painful bending and stooping. Infants, especially premature ones, may benefit from the closeness and added security of sleeping next to their parents. Parental bonding may be improved. Parents can monitor the infant during the night and attend to every whimper. Parents can soothe the infant without getting out of bed. Breast feeding can be more convenient.

In one embodiment, one of the side walls extends the entire length of the infant bed, and a footboard is provided which attaches to this side wall. This leaves only one opening on the other side, between the partial side wall and the footboard. This embodiment is particularly useful in hospital situations, and may include Velcro straps on the elongated side wall for secure attachment of the unit to the rails of the hospital bed.

The unit is portable and washable. It should be made from flame retardant material. The mattress should be waterproof.

A variety of additional features may be incorporated into the unit including any or all of the following:

Zippers may be provided to close the unit against itself during transport. When closed, the unit may act as a storage area for other items, such as blankets, diapers and clothes. In lieu of zippers, the unit may be provided with a separate carrying bag.

A plurality of pockets may be provided on the outside of the headboard and side walls of the unit for storing medicine, pacifiers, diaper pins, etc.

Openings may be provided on the bottom of the support surface for engagement with suction cups. A pair of slots may also be provided in the headboard for attaching a restraining belt. By removing the fabric cover from this embodiment, the unit may be used as a bath seat, with the suction cups attaching to the bathtub, and the belt holding the baby onto the unit. Removing the suction cups from this embodiment allows the unit to be attached to an adult cushion or chair. Additional slots and belts may be employed for this purpose.

A night light may be built into the back of the headboard that can be touched on and off, for checking the condition of the infant at night.

A plurality of clear pockets may be provided on the inside walls of the unit into which any number of different cards may be placed. The cards may include black, red, geometric or other designs for visual stimulation of the infant.

A removable wedge may be provided that is inserted between the mattress and the flat lower support surface of the unit to elevate the infant's head, especially when congested, in order to aid in healthy breathing.

A multitude of combinations of the various features listed above may be incorporated into a given embodiment of the unit, depending on the needs and desires of the user.

It is therefore a primary object of the present invention to provide a bed for an infant that may be used on an adult bed without fear of suffocation, overheating or rollover injury to the infant.

It is a further important object of the present invention to provide a portable, collapsible infant bed that may be moved from place to place.

It is a further object of the present invention to provide a transportable unit for holding a reclining infant that may be used in a bed, bathtub, sofa, chair or other appropriate flat surface.

Additional objects of the invention will be apparent from the detailed descriptions and the claims herein.

DETAILED DESCRIPTION OF THE PREFERRED EMBODIMENTS

Figure 1:
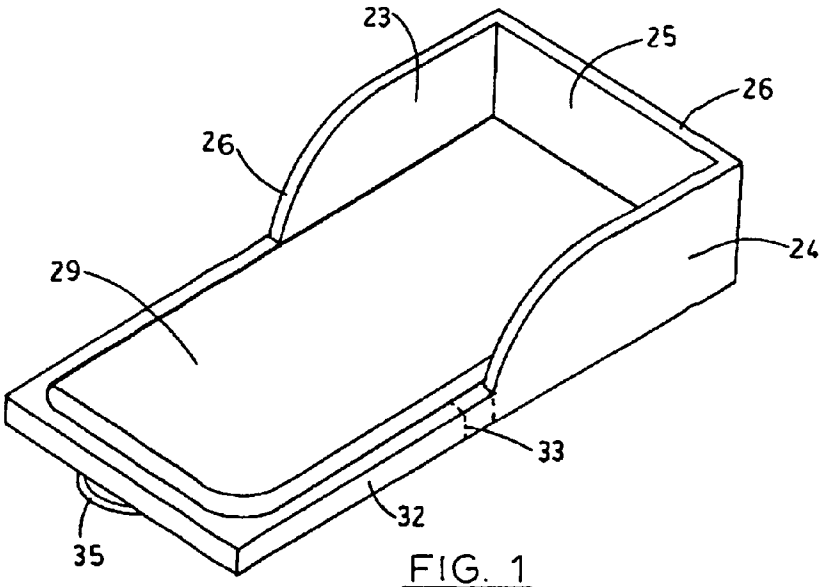
FIG. 1 is an isometric view of the present invention.
Figure 2:
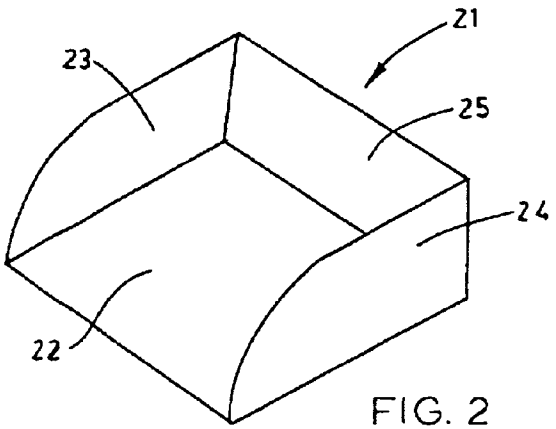
FIG. 2 is an isometric view of the interior support piece of the present invention.
Figure 2A:
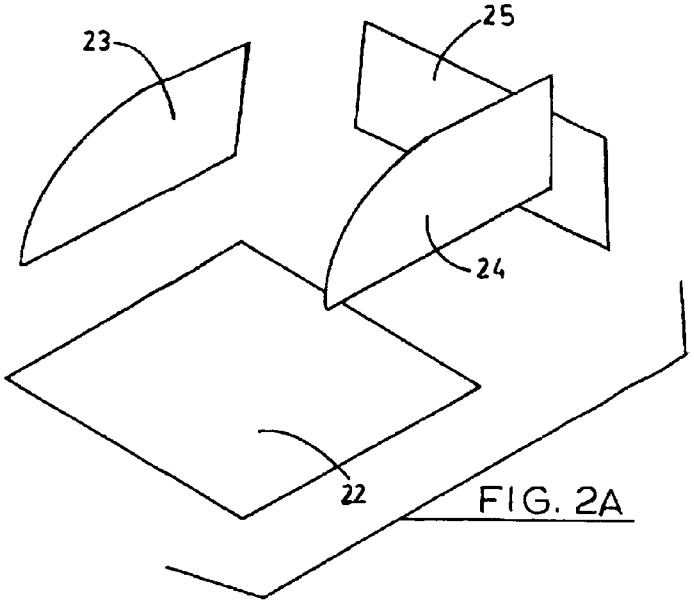
FIG. 2A is an exploded view of FIG. 2 showing the detachable panels of said support piece.
Figure 3:
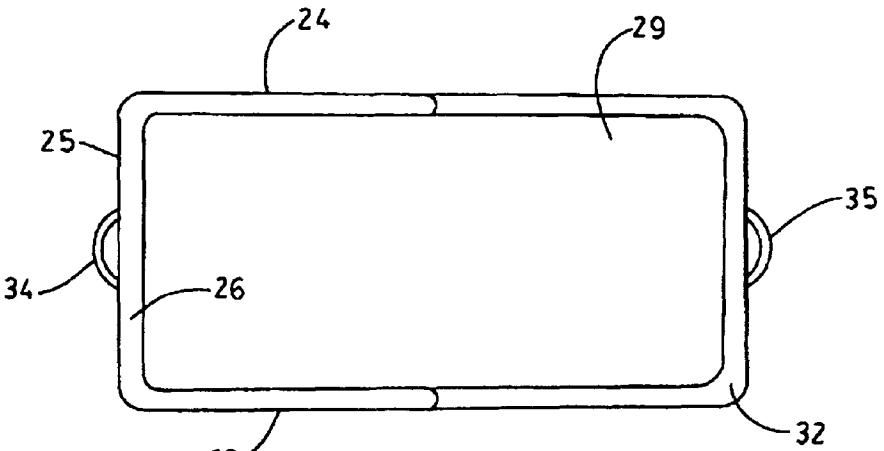
FIG. 3 is a top plan view of the present invention.

Referring to the drawings wherein like reference characters designate like or corresponding parts throughout the several views, and referring particularly to FIGS. 1 and 2, it is seen that the invention includes an interior support base 21 having a flat bottom surface 22, an end panel (head board) 25 attached perpendicularly at the proximal end of surface 22, and side panels 23, 24 attached perpendicularly along either side of surface 22. The proximal end of each side panel 23 and 24 is attached to end panel 25 to form a right angle with end panel 25. The distal ends of side panels 23 and 24 form an arcuate curve which intersects the distal end of surface 22.

Panels 23, 24, and 25 may be integrally formed or attached with surface 22 to form a single rigid piece. Alternatively, panels 23, 24 and 25 may be detachably attachable to surface 22, in order to allow the invention to be disassembled for easier storage and transport.

Figure 4:
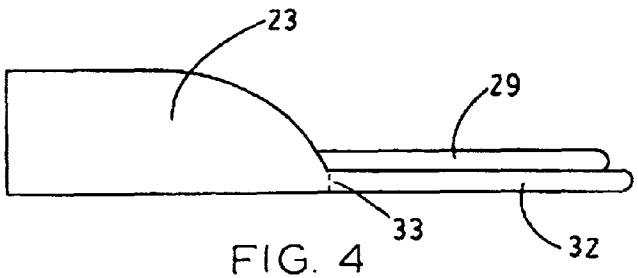
FIG. 4 is a side elevational view of the present invention.
Figures 8, 9, 10:
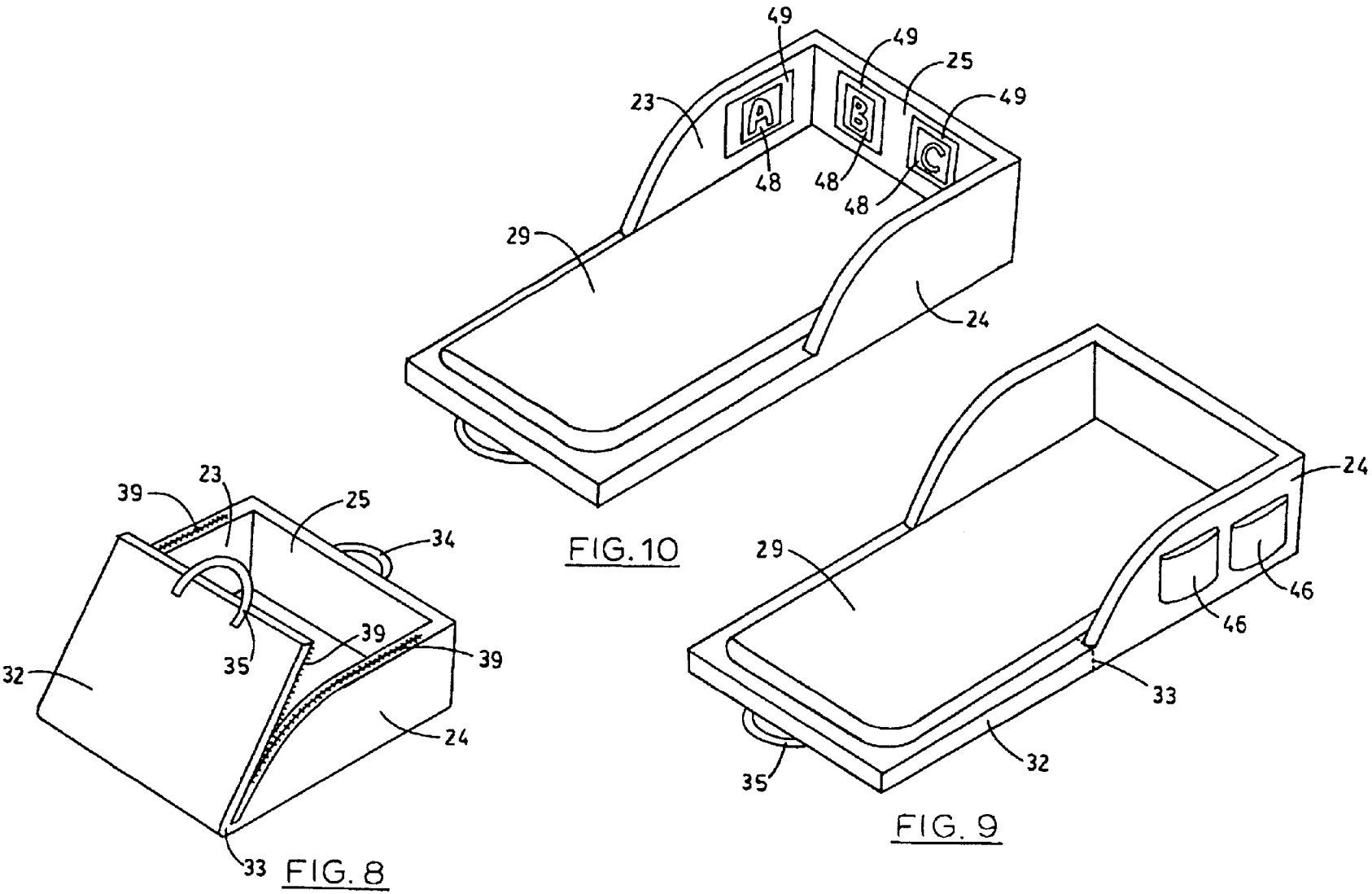
FIG. 8 is a side perspective view of the present invention showing it partially folded against itself.
FIG. 9 is an isometric view of an alternative embodiment of the present invention.
FIG. 10 is an isometric view of an alternative embodiment of the present invention.

A soft fabric cover or quilt 26 is provided which fits over surface 22, side panels 23 and 24, and end panel 25 as shown in FIGS. 1–4, and 8–12. This cover also includes an extended fabric section 32 which extends out from the open end of support base 21 as shown in FIG. 1. A fabric or other hinge 33 is provided on cover section 32 where it meets base 21, thereby allowing the extended section 32 to fold into base 21 as shown in FIG. 8. A mattress pad 29 is provided, the proximal end of which fits snugly against panels 23, 24 and 25 of support base 21. The distal end of pad 29 extends out over extended section 32 as shown in FIGS. 1 and 4. Pad 29 may either be removed or folded inside when the invention is folded as shown in FIG. 8. Handles 34 and 35 are provided at either end of the cover to assist in transporting the invention when it is folded together along hinge 33. Zippers, Velcro or other attachment means 39 may be provided in order to hold section 32 against panels 23 and 24.

In the preferred embodiment, the fabric cover should be made of washable fire retardant material. The mattress pad should be firm, washable and waterproof.

Figure 7:
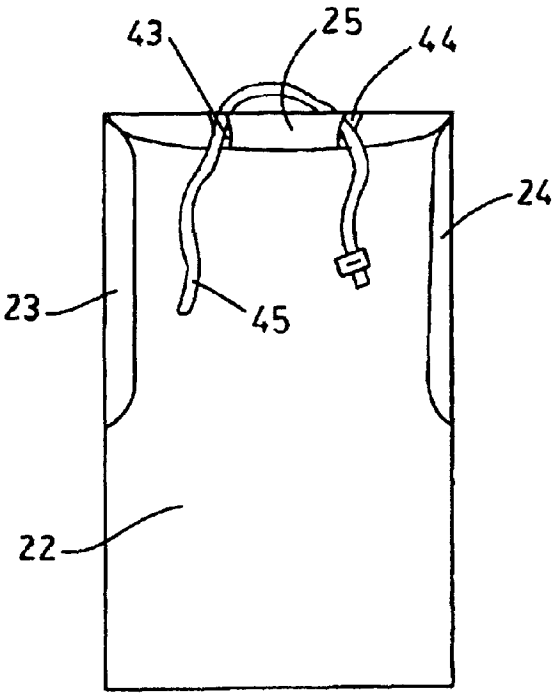
FIG. 7 is a top plan view of the embodiment of FIGS. 5 and 6.
Figure 6:
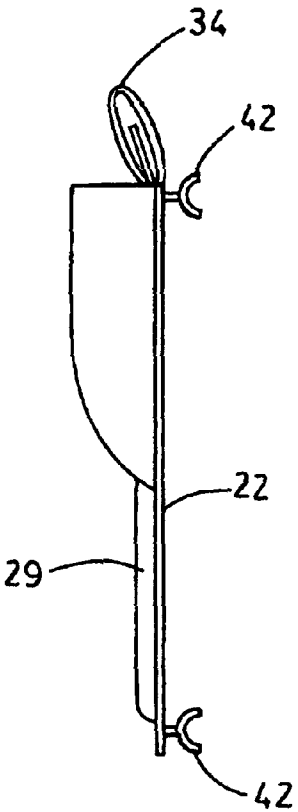
FIG. 6 is a side view of the embodiment of FIG. 5.
Figure 5:
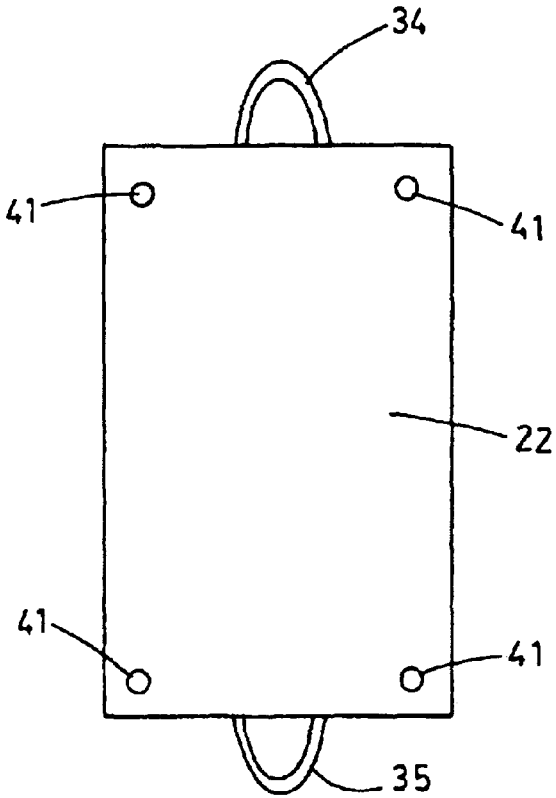
FIG. 5 is a bottom plan view of an alternative embodiment of the present invention.

In an alternative embodiment shown in FIGS. 5–7, a set of openings 41 are provided on the back of base 21 to receive suction cups 42. The suction cups 42 allow base 21 to be attached to a smooth surface such as a bathtub or counter. While four openings and suction cups are illustrated, any suitable number of openings and suction cups may be employed. A pair of slots 43 and 44 are also provided in the base of this embodiment to receive belt 45 which may be used to secure an infant in the device during use.

In another alternative embodiment shown in FIG. 9, a plurality of pockets 46 are provided on the cover on the outsides of any of panels 23, 24 and/or 25. These pockets are useful for storing such things as thermometers, tissues, pins, medicine, and the like.

In another alternative embodiment shown in FIG. 10, a plurality of clear pockets 49 are provided on the cover on the inside surfaces of panels 23, 24 and/or 25 of the unit into which any number of different cards 48 may be placed to provide visual stimulation of the infant.

Figure 11:
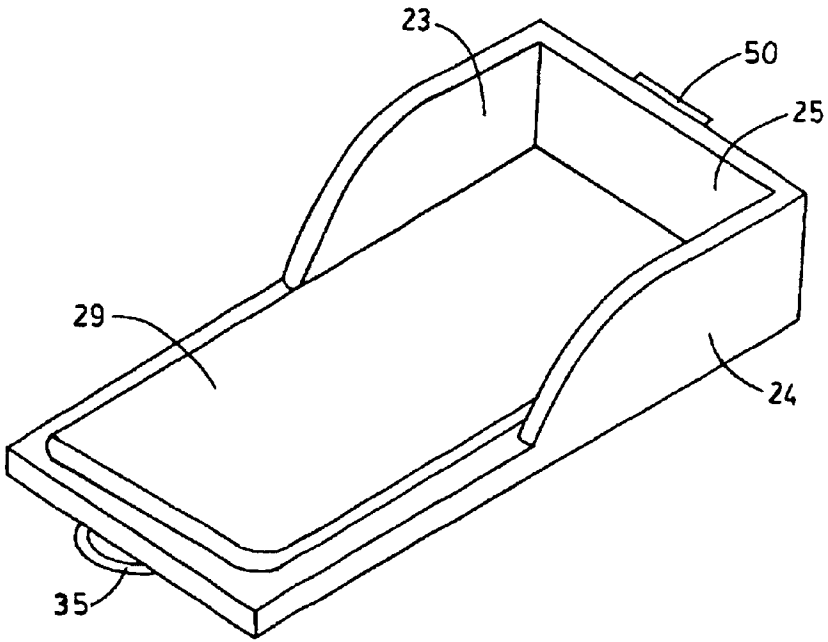
FIG. 11 is an isometric view of an alternative embodiment of the present invention.

In another alternative embodiment shown in FIG. 11, a night light 50 is provided on the back of headboard panel 25.

Figure 13:
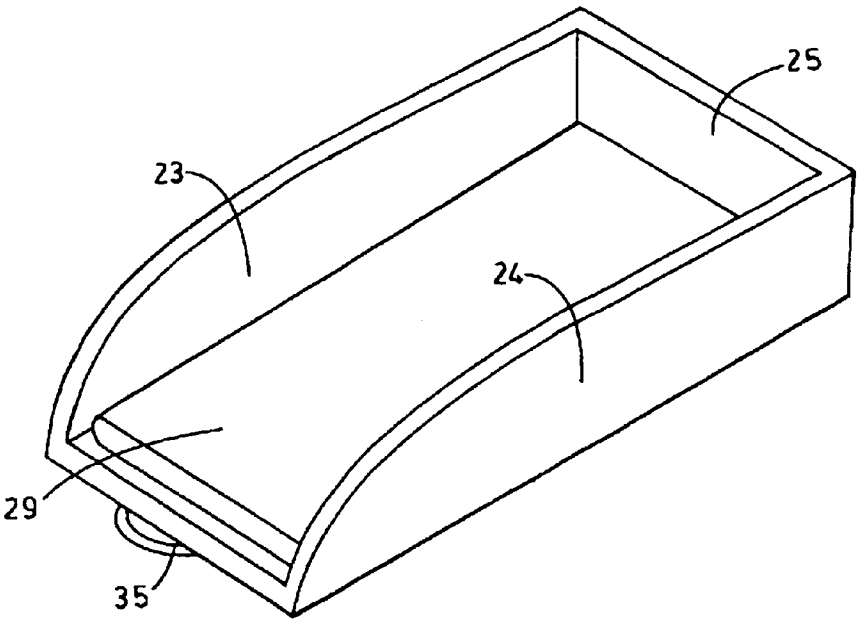
FIG. 13 is an isometric view of an alternative embodiment of the present invention.
Figure 12:
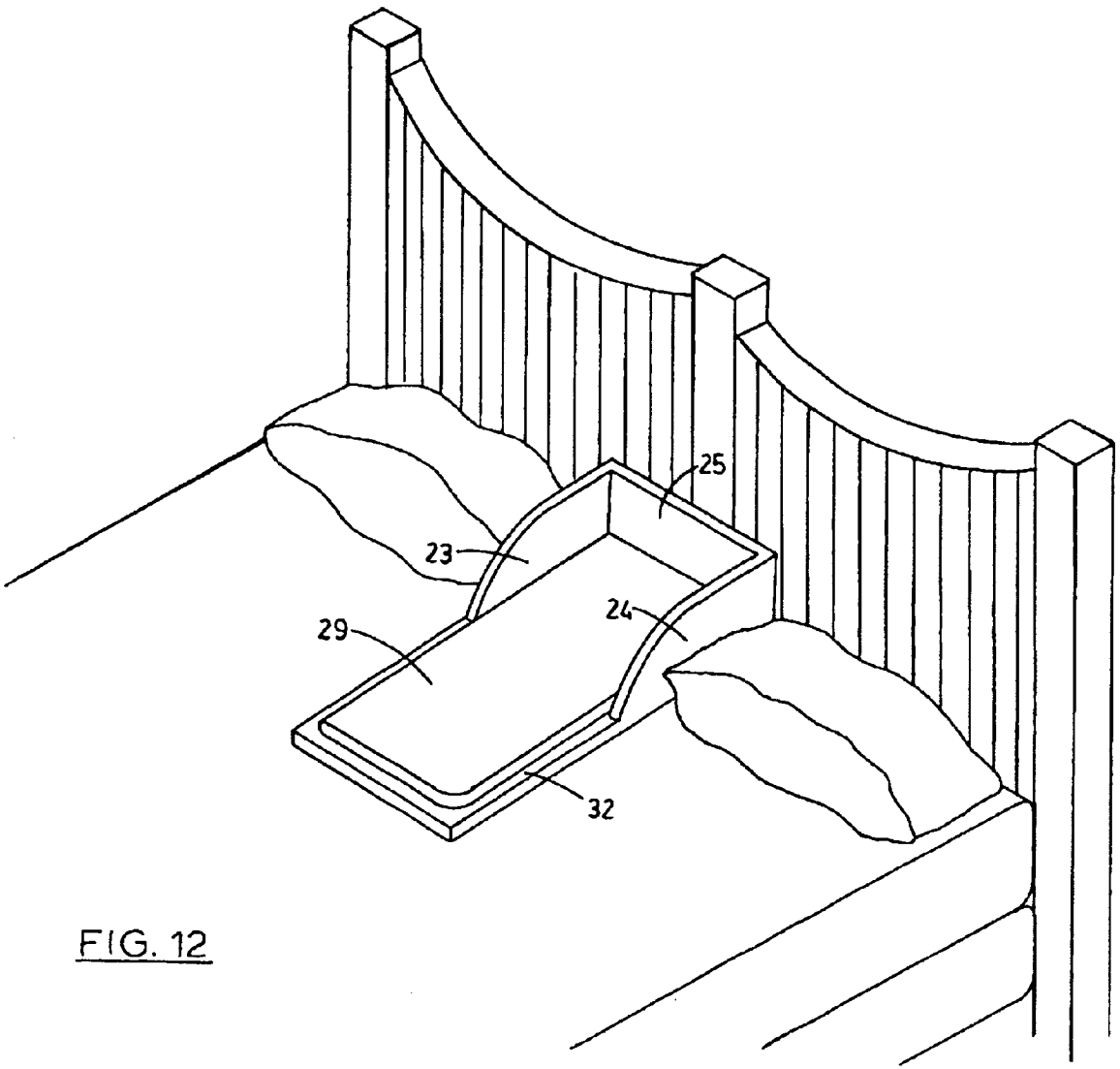
FIG. 12 is an environmental view showing the invention in use on an adult bed.

In another alternative embodiment shown in FIG. 13, side panels 23 and 24 may be extended the entire length of pad 29 to provide a more secure environment for the infant.

Figure 14:
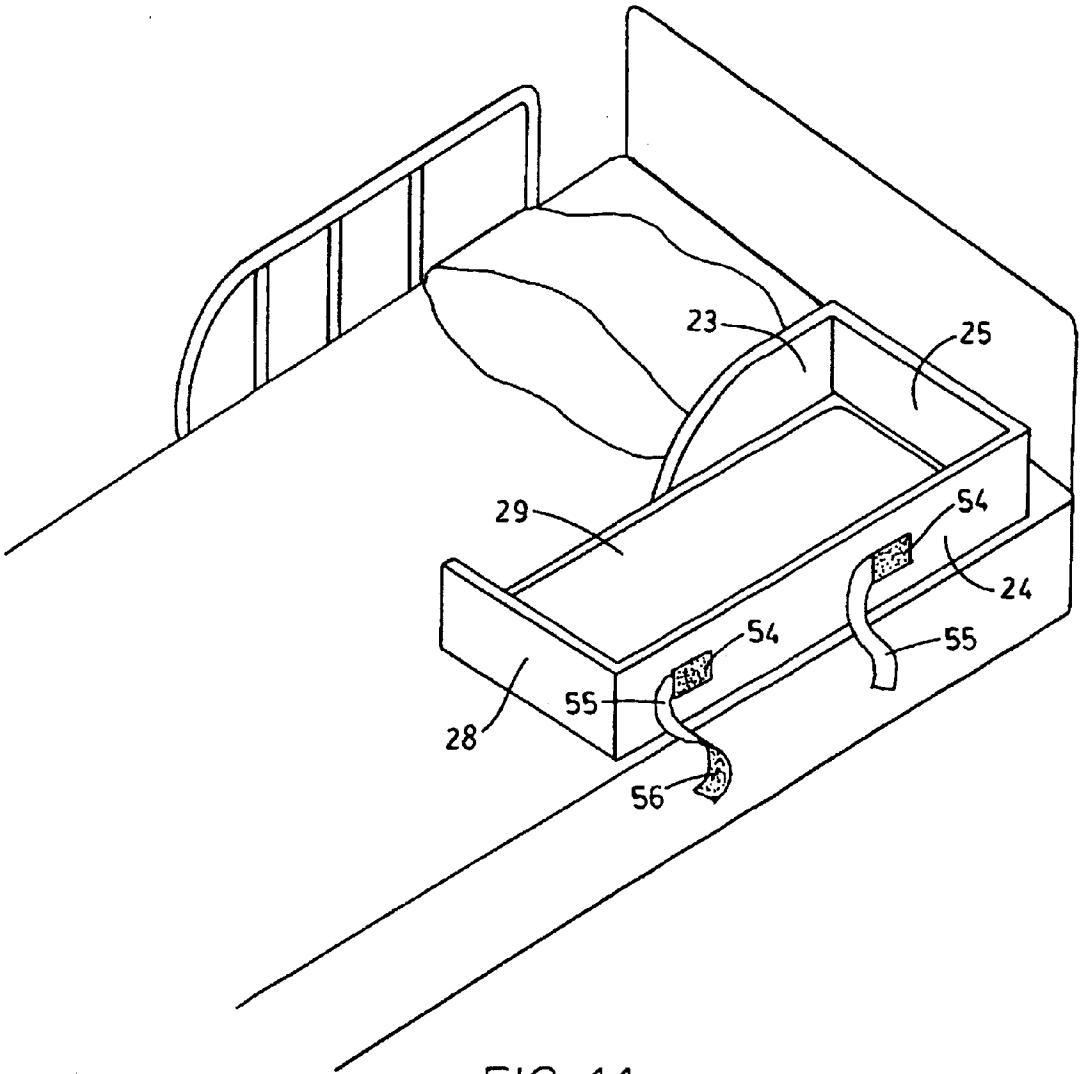
FIG. 14 is an environmental view of an alternative embodiment of the present invention in use on a hospital bed.

In another alternative embodiment shown in FIG. 14, side panel 23 or 24 is extended the entire length of the unit, and a footboard panel 28 is provided at the bottom. Panels 23, 24, 25 and 28 may be detachable from base panel 22 to facilitate easy storage, or they may be integrated into a single unit. The fabric cover 26 fits over the base panel 22 and all of side/end panels 23, 24, 25 and 28. A plurality of pockets may be provided on cover 26 of this embodiment on either the inside or outside surfaces of any of panels 23, 24 and/or 25. This unit is particularly useful in a hospital bed where the rails may be used to hold the unit in the bed. One or more straps 55 may be attached to the extended side panel 23 or 24 (in the illustration of FIG. 14, panel 24 is the extended one; however, panel 23 could alternatively be extended). Velcro hooks 54 and loops 56, elastic, buckles, or other suitable attachment means may be employed on the straps to secure them to the bed rails.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A portable infant bed comprising:

a. a support unit including a generally rectangular flat base panel having two parallel longitudinal sides and two parallel ends, a detachable end wall perpendicularly attached at one end of said panel, and a pair of detachable parallel side walls perpendicularly attached to the two longitudinal sides of said base panel and to said end wall;

b. a fabric cover fitting over the base panel, side walls and end wall of said unit, said cover extending beyond the opposite end of said base panel; and c. a generally rectangular pad that fits against said end wall and side walls, said pad extending beyond said base panel and over said extended cover.

2. [The infant bed of claim 1] *A portable infant bed comprising:*

*a. a support unit including*

*a generally rectangular flat base panel having two parallel longitudinal sides and two parallel ends,*

*an end wall perpendicularly attached at one end of said panel, and*

*a pair of parallel side walls perpendicularly attached to the two longitudinal sides of said base panel and to said end wall* wherein said base panel, end wall and side walls are integrated into a single unit*;*

*b. a fabric cover fitting over the base panel, side walls and end wall of said unit, said cover extending beyond the opposite end of said base panel; and*

*c. a generally rectangular pad that fits against said end wall and side walls, said pad extending beyond said base panel and over said extended cover.*

3. The infant bed of claim 1 wherein a pair of handles are provided, one in the vicinity of said end wall and the other on said cover extension, and a fabric hinge is provided in said cover at a point beyond said base panel.

4. The infant bed of claim 3 wherein a means for securing said bed against itself is provided on said cover.

5. The infant bed of claim 4 wherein each of said side walls has an inside surface and an outside surface covered by said cover, and a plurality of pockets are provided on said cover on said outside surfaces.

6. The infant bed of claim 5 wherein a plurality of transparent pockets are provided on said cover on said inside surfaces.

7. A portable infant support unit comprising a generally rectangular flat base panel having two parallel longitudinal sides and two parallel ends, an end wall perpendicularly attached at one end of said panel, a pair of parallel side walls perpendicularly attached along a portion of the two longitudinal sides of said panel and to said end wall, a plurality of openings on the back of said base panel for receiving suction cups, at least one pair of slots provided in said end wall for receiving a securement belt, a fabric cover covering the base panel, side walls and end wall of said unit, said cover having openings therein which correspond to the positions of said suction cups and slots, and a generally rectangular pad that fits inside said end walls and said side walls on top of said cover.

8. A portable infant bed comprising:

a. a support unit including a generally rectangular flat base panel having two parallel longitudinal sides and two parallel ends, a first detachable end wall perpendicularly attached at one end of said panel, a second detachable end wall perpendicularly attached at the opposite end of said panel, a first detachable side wall perpendicularly attached along one of the two longitudinal sides of said base panel and to each of said end walls, and a second detachable partial side wall perpendicularly attached along a portion of the opposite longitudinal side of said base panel and to one of said end walls, leaving a gap between said second side wall and said other end wall;

b. a fabric cover fitting over the base panel, side walls and end walls of said unit; and c. a generally rectangular pad that fits inside said end walls and said side walls on top of said cover.

9. [The infant bed of claim 8] *A portable infant bed comprising:*

*a. a support unit including*

*a generally rectangular flat base panel having two parallel longitudinal sides and two parallel ends,*

*a first end wall perpendicularly attached at one end of said panel,*

*a second end wall perpendicularly attached at the opposite end of said panel,*

*a first side wall perpendicularly attached along one of the two longitudinal sides of said base panel and to each of said end walls, and*

*a second partial side wall perpendicularly attached along a portion of the opposite longitudinal side of said base panel and to one of said end walls, leaving a gap between said second side wall and said other end wall* wherein said base panel, end walls and side walls are integrated into a single unit*;*

*b. a fabric cover fitting over the base panel, side walls and end walls of said unit; and*

*c. a generally rectangular pad that fits inside said end walls and said side walls on top of said cover.*

10. The infant bed of claim 8 wherein a plurality of straps are provided on said first side wall for securing said unit in place.

11. The infant bed of claim 10 wherein each of said side walls has an inside surface and an outside surface, and a plurality of pockets are provided on said cover on said outside surfaces.

12. The infant bed of claim 11 wherein a plurality of transparent viewing pockets are provided on said cover on said inside surfaces for holding replaceable designs to stimulate the visual senses of a baby on said pad.

13. A portable infant bed comprising:

a. a generally rectangular flat base panel having two parallel longitudinal sides and two shorter parallel ends;

b. a detachable end panel perpendicularly attachable to one end of said base panel;

c. a first detachable side panel perpendicularly attachable along one of the two longitudinal sides of said base panel and to said end panel to form a first corner;

d. a second detachable side panel perpendicularly attachable along the opposite longitudinal side of said base panel and to said end panel to form a second corner; and e. a generally rectangular pad for placement on said base panel between said side panels, a proximal end of said pad abutting against said end panel and a distal end of said pad extending outwardly beyond said base panel.

14. The infant bed of claim 13 wherein the first and second corners are each rounded.

15. The infant bed of claim 13 wherein a fabric cover is provided that fits over the base panel, side panels and end panel of said bed such that said pad fits on top of said cover between said side panels.

*16. A portable infant bed comprising:*

*a. an integrated support unit comprising*

*a generally rectangular flat base panel having two parallel longitudinal sides and two parallel ends,*

*an end wall perpendicularly attached at one end of the base panel,*

*a first side wall perpendicularly attached along one of the two longitudinal sides of the base panel and to the end wall;*

*a second side wall perpendicularly attached along the other of the two longitudinal sides of the base panel and to the end wall;*

*b. a fabric cover fitting over the base panel, side walls and end wall of the unit, said cover extending beyond the opposite end of the base panel; and*

*c. a generally rectangular pad that fits between said side walls, said pad extending beyond the base panel adjacent to the extended cover.*

*17. The infant bed of claim 16 wherein said base panel has a generally square shape.*

*18. The infant bed of claim 16 wherein at least one handle is provided on said cover.*

*19. The infant bed of claim 18 wherein a pair of handles are provided, one handle being in the vicinity of said end wall and the other on said cover extension, and a fabric hinge is provided in said cover at a point beyond said base panel.*

*20. The infant bed of claim 16 wherein a fabric hinge is provided in said extended cover at a point beyond said base panel.*

*21. The infant bed of claim 20 wherein a means for securing said bed against itself is provided on said cover.*

*22. The infant bed of claim 18 wherein each of said side walls has an inside surface and an outside surface covered by said cover, and a plurality of pockets are provided on said cover on said outside surfaces.*

*23. The infant bed of claim 18 wherein a plurality of slots are provided in said end wall for receiving a securement belt.*

*24. The infant bed of claim 18 wherein a plurality of openings are provided on the back of said base panel for receiving suction cups.*

*25. The infant bed of claim 16 wherein at least one opening is provided in said cover.*

*26. The infant bed of claim 16 wherein at least one zipper is provided for closing said fabric cover.*

*27. The infant bed of claim 16 wherein interengaging hooks and loops are provided for closing said fabric cover.*

*28. The infant bed of claim 16 wherein a night light is provided in one of said walls.*

*29. The infant bed of claim 16 wherein a wedge is provided for lifting a portion of an infant's body.*

*30. The infant bed of claim 16 wherein a separate removable cover is provided for said pad.*

*31. A portable infant bed comprising:*

*a. an integrated support unit including*

*a generally rectangular flat base panel having two parallel longitudinal sides and two parallel ends, a first end wall perpendicularly attached at one end of said panel, a second end wall perpendicularly attached at the opposite end of said panel, a first side wall perpendicularly attached along one of the two longitudinal sides of said base panel and to each of said end walls, and a second partial side wall perpendicularly attached along a portion of the opposite longitudinal side of said base panel and to one of said end walls, leaving a gap between said second side wall and said other end wall;*

*b. a fabric over fitting over the base panel, side walls and end walls of said unit; and*

*c. a generally rectangular pad that fits inside said end walls and said side walls adjacent to said cover.*

*32. The infant bed of claim 31 wherein at least one slot is provided in one of said end walls for receiving a securement belt.*

*33. The infant bed of claim 32 wherein said cover has at least one opening therein corresponding to the position of each slot.*

*34. The infant bed of claim 31 wherein each of said side walls has an inside surface and an outside surface covered by said cover, and*

*at least one pocket provided on said cover on at least one of said outside surfaces.*

*35. The infant bed of claim 31 wherein each of said side walls has an inside surface and an outside surface covered by said cover, and*

*at least one pocket is provided on said cover on at least one of said inside surfaces.*

*36. The infant bed of claim 31 wherein a night light is provided in one of said walls.*

*37. The infant bed of claim 31 wherein a wedge is provided for lifting a portion of an infant's body.*

*38. The infant bed of claim 31 wherein a separate removable cover is provided for said pad.*

*39. The infant bed of claim 31 wherein a plurality of straps are provided on said first side wall for securing said unit in place.*

*40. The infant bed of claim 39 wherein said cover has at least one opening therein corresponding to the position of each strap.*

*41. A portable infant support unit comprising*

*a generally rectangular flat base panel having two parallel longitudinal sides and two parallel ends,*

*an end wall perpendicularly attached at one end of said panel,*

*a first side wall perpendicularly attached along one of the two longitudinal sides of the base panel and to the end wall, and*

*a second side wall perpendicularly attached along the other of the two longitudinal sides of the base panel and to the end wall,*

*at least one opening on the back of said base panel for receiving suction cups,*

*a fabric cover covering the base panel, side walls and end wall of said unit, said cover having at least one opening therein corresponding to the position of each suction cup, and*

*a generally rectangular pad that fits between said side walls on top of said cover.*

*42. A portable infant support unit comprising*

*a generally rectangular flat base panel having two parallel longitudinal sides and two parallel ends,*

*an end wall perpendicularly attached at one end of said panel,*

*a first side wall perpendicularly attached along one of the two longitudinal sides of the base panel and to the end wall, and*

*a second side wall perpendicularly attached along the other of the two longitudinal sides of the base panel and to the end wall,*

*at least one pair of slots provided in said end wall for receiving a securement belt,*

*a fabric cover covering the base panel, side walls and end wall of said unit, said cover having at least one opening therein which corresponds to the position of each slot, and*

*a generally rectangular pad that fits between said side walls on top of said cover.*

* * * * *